United States Patent
Gruner-Nielsen et al.

(10) Patent No.: US 8,428,413 B2
(45) Date of Patent: *Apr. 23, 2013

(54) STRETCHER FIBER AND MODULE

(75) Inventors: Lars Gruner-Nielsen, Copenhagen (DK); Dan Peter Jakobsen, Copenhagen (DK); Kim Geissmann Jespersen, Copenhagen (DK)

(73) Assignee: OFS Fitel, LLC, Norcross, GA (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/985,546

(22) Filed: Jan. 6, 2011

(65) Prior Publication Data

US 2011/0097046 A1  Apr. 28, 2011

Related U.S. Application Data

(63) Continuation-in-part of application No. 12/329,561, filed on Dec. 6, 2008, now Pat. No. 8,107,783.

(60) Provisional application No. 61/292,970, filed on Jan. 7, 2010, provisional application No. 61/078,589, filed on Jul. 7, 2008.

(51) Int. Cl.
*G02B 6/02* (2006.01)
*G02B 6/036* (2006.01)

(52) U.S. Cl.
USPC .......................................................... 385/127

(58) Field of Classification Search ................... 385/127
See application file for complete search history.

(56) References Cited

U.S. PATENT DOCUMENTS

| | | | | |
|---|---|---|---|---|
| 6,493,494 | B1* | 12/2002 | Rousseau et al. | 385/123 |
| 6,498,887 | B1* | 12/2002 | Gruner-Nielsen et al. | 385/123 |
| 6,819,847 | B2* | 11/2004 | Matsuo et al. | 385/123 |
| 7,486,436 | B1* | 2/2009 | Kuksenkov et al. | 359/333 |
| 7,532,797 | B2* | 5/2009 | Hirano | 385/123 |
| 7,715,672 | B2* | 5/2010 | Dong et al. | 385/109 |
| 7,817,681 | B2* | 10/2010 | Kuksenkov et al. | 372/6 |
| 8,107,783 | B2* | 1/2012 | Gruner-Nielsen | 385/127 |
| 2004/0105638 | A1* | 6/2004 | Sillard et al. | 385/123 |
| 2004/0146258 | A1* | 7/2004 | Yamamoto et al. | 385/123 |
| 2005/0201700 | A1* | 9/2005 | Aikawa et al. | 385/123 |

* cited by examiner

*Primary Examiner* — Omar Rojas
(74) *Attorney, Agent, or Firm* — Law Offices of Jachs & Kim, LLP

(57) ABSTRACT

A stretcher fiber has a core region, inner trench region, ring region, outer trench region, and outer cladding region. The fiber regions are structured to provide the stretcher fiber with a relationship between dispersion and wavelength, such that the second and third derivatives of the stretcher fiber's propagation constant with respect to angular frequency have a shape and wavelength range matching those of a selected compressor module.

20 Claims, 19 Drawing Sheets

200

| Fiber Region | Material | Dopant(s) | n | $\Delta n \ (\times 10^{-3})$ | Width | Outer Radius |
|---|---|---|---|---|---|---|
| Core | $SiO_2$ | $GeO_2$ | $n_1$ | $\Delta n_1 = n_1 - n_0 = 21.9$ | N/A | 0.98 μm |
| Inner Trench | $SiO_2$ | $GeO_2$, F | $n_2$ | $\Delta n_2 = n_2 - n_0 = (-8.9)$ | 2.96 μm | 3.94 μm |
| Ring | $SiO_2$ | $GeO_2$, F | $n_3$ | $\Delta n_3 = n_3 - n_0 = 6.8$ | 1.38 μm | 5.32 μm |
| Outer Trench | $SiO_2$ | $P_2O_5$, F, $GeO_2$ (optional) | $n_4$ | $\Delta n_4 = n_4 - n_0 = (-1.0)$ | 1.76 μm | 7.08 μm |
| Outer Cladding | $SiO_2$ | none | $n_0$ | $\Delta n_0 = n_0 - n_0 = 0.0$ | 55.42 μm | 62.50 μm |

| | @ 1030 nm | @ 1060 nm |
|---|---|---|
| Relative Dispersion Slope | 0.0094 nm$^{-1}$ | 0.0130 nm$^{-1}$ |
| Dispersion | −164 ps/(nm·km) | −236 ps/(nm·km) |
| Attenuation | 2.9 dB/km | 2.6 dB/km |
| Modefield Diameter (Petermann II) | 2.9 μm | 3.0 μm |
| Wavelength for 0.5 dB loss for one turn around a mandrel with a diameter of 30 mm | 1072 nm | |
| Cut-off Wavelength | 970 nm | |

| | |
|---|---|
| $\beta_2$ | 111 ps²/km |
| $\beta_3/\beta_2$ | -7.7 fs |
| Attenuation | 2.5 dB/km |
| PMD | 0.04 ps·km$^{-0.5}$ |
| Effective area | 6.4 µm² |
| Cut off wavelength | 945 nm |
| Splice loss to SM fiber | 0.2 dB |

| Mode | $LP_{02}$ |
|---|---|
| $\beta_2$ | −36 ps²/km |
| $\beta_3/\beta_2$ | 2.8 fs |
| Attenuation | 2.2 dB/km |
| PMD | 0.15 ps·km$^{-0.5}$ |
| Effective area | 43 μm² |
| Loss per mode converter incl. splices | 0.5 dB |

FIG. 25

STRETCHER FIBER AND MODULE

CROSS REFERENCE TO RELATED APPLICATIONS AND INCORPORATION BY REFERENCE

The present application is a continuation-in-part of U.S. patent application Ser. No. 12/329,561, filed on Dec. 6, 2008, "Stretcher Fiber and Module", which claims the priority benefit of U.S. Provisional Patent Application Ser. No. 61/078,589, filed on Jul. 7, 2008.

The present application claims the priority benefit of U.S. Provisional Patent Application Ser. No. 61/292,970, filed on Jan. 7, 2010, "Stretcher Fiber for User in Femtosecond Chirped Pulse Ytterbium Amplifiers."

The above-referenced patent applications are owned by the owner of the present application, and are incorporated herein by reference in their entirety.

BACKGROUND OF THE INVENTION

1. Field of the Invention

The present invention relates generally to optical fiber devices and methods, and in particular to an improved stretcher fiber and module for use in a chirped pulse amplification system.

2. Background Art

Chirped pulse amplification (CPA) is a technique for amplifying an ultrashort laser pulse up to the petawatt ($10^{15}$ watt) level. A laser generates an output comprising a series of ultrashort pulses of relatively low power. These pulses are then fed into a stretcher module having a dispersion that causes the pulses to stretch out. The stretched pulse output is then fed into a high-power amplifier. The stretched, amplified pulses are then fed into a compressor module having a dispersion opposite to that of the stretcher module to produce a recompressed amplified pulse output. By stretching the pulses prior to amplification, it is possible to reduce the peak power of the pulses, and to avoid undesirable nonlinearities.

A compressor module is typically fabricated using free-space gratings and other components. The performance of a compressor module depends on a number of parameters, including the distance between gratings and the incidence angle. A compressor module design can be upgraded to meet the needs of a specific high-performance application by increasing the distance between gratings, decreasing the incidence angle, or both. Generally speaking, it is preferable to decrease the incidence angle. However, a decreased incidence angle results in an increased relative dispersion slope (RDS). Thus, the amount that the incidence angle can be decreased is limited by the availability of a stretcher module that can be matched to the compressor module.

Currently, in order to achieve a sufficiently high RDS, stretcher modules are fabricated using free-space diffraction gratings. However, for a number of reasons, it would be desirable to use an all-fiber-based solution. Although there have been efforts to create a fiber-based stretcher, these attempts have fallen short. In one case, 400 meters of standard low-cutoff single mode fiber was used as a stretcher. However, as a compressor typically has a positive RDS, and a standard low-cutoff single mode fiber typically has a negative RDS, no dispersion slope match is readily obtainable. To overcome this issue, a complicated balancing of the slope mismatch and nonlinearities in the amplifier fibers is required. In another case, a fiber with an RDS of 0.0053 nm$^{-1}$ at 1050 nm was described. That fiber matches a grating compressor with a dispersion of $\beta_2 = -1.6$ ps$^2$ (D=2.7 ps/nm) at 1050 nm, and is of limited utility. Thus, exists a need for an all fiber-based stretcher module that overcomes such drawbacks.

SUMMARY OF THE INVENTION

These and other issues in the art are addressed by the present invention, an aspect of which provides a new stretcher fiber. The fiber includes a core region, inner trench region, ring region, outer trench region, and outer cladding region. The core region has a radius $r_1$, a refractive index $n_1$, and a positive effective refractive index $\Delta n_1$ with respect to the outer cladding region, which has an outer radius $r_0$ and a refractive index $n_0$. The core region effective refractive index $\Delta n_1$ is equal to $n_1 - n_0$. The inner trench region surrounds the core region and has an outer radius $r_2$, a refractive index $n_2$ less than $n_0$, and a negative effective refractive index $\Delta n_2$ equal to $n_2 - n_0$. The ring region surrounds the trench region and has an outer radius $r_3$, a refractive index $n_3$ greater than $n_0$, and a positive effective refractive index $\Delta n_3$ equal to $n_3 - n_0$. The outer trench region surrounds the ring region and has an outer radius $r_4$, a refractive index $n_4$ less than $n_0$, and a negative effective refractive index $\Delta n_4$ equal to $n_4 - n_0$. The outer cladding region surrounds the outer trench region.

The values of $r_0$, $r_1$, $r_2$, $r_3$, $r_4$, $\Delta n_1$, $\Delta n_2$, $\Delta n_3$, and $\Delta n_4$ are structured to provide the stretcher fiber with a relationship between dispersion and wavelength, wherein the stretcher fiber $\beta_2$ and $\beta_3/\beta_2$ curves have a shape and wavelength range matching those of a selected compressor module.

$\beta_2$ is the second derivative of the stretcher fiber's propagation constant $\beta$ with respect to angular frequency $\omega$:

$$\beta_2 = \frac{d^2\beta}{d\omega^2}.$$

and $\beta_3$ is the third derivative of the selected fiber's propagation constant $\beta$ with respect to angular frequency $\omega$:

$$\beta_3 = \frac{d^3\beta}{d\omega^3}.$$

A further aspect of the invention provides a stretcher module for use in a pulse amplification system, comprising a unitary length of the described stretcher.

BRIEF DESCRIPTION OF THE DRAWINGS

FIGS. 8 and 9 show tables setting forth specific design and performance details of the fiber shown in FIGS. 5-7.

FIG. 21 shows a table setting forth properties of an exemplary stretcher fiber at 1030 nm.

FIG. 25 is a table that shows measured properties for a fabricated HUM fiber working in the $LP_{02}$ mode at 1030 nm.

DETAILED DESCRIPTION

Described hereinbelow are techniques for designing and fabricating a fiber for use in pulse stretchers for chirped pulse amplifiers working in the 1000 nm wavelength range of Yb fiber amplifiers. An exemplary fiber designed and fabricated according to the described techniques has a high numerical third-order-to-second-order dispersion β3/β2 ratio of −7.7 fs. The fiber has very good dispersion match to a grating compressor for second-, third-, and even fourth-order dispersion. By combining the exemplary stretcher fiber with an anomalous dispersion fiber working in a higher-order mode, an even higher β3/β2 ratio of −16.8 fs is demonstrated. The combined module shows very good dispersion match to a grating compressor.

The present discussion is divided into two sections. Section I and FIGS. 1-19 are directed to an exemplary stretcher fiber and module, which is the subject matter of co-pending U.S. patent application Ser. No. 12/329,561, incorporated herein by reference. Section I provides background and context for Section II.

Section II and FIGS. 20-29 are directed to additional details with respect to the design and manufacture of the stretcher fibers described in Section I.

I. Exemplary Stretcher Fiber and Module

Aspects of the present invention are directed to systems and techniques that provide an all-fiber-based solution for a stretcher module for chirped amplification in a short-pulse fiber laser operating within a specified wavelength band, e.g., 1000-1100 nm. A first aspect of the invention is directed to a new stretcher fiber that may be used by itself directly in a stretcher module. According to a further aspect of the invention, a stretcher module is constructed by splicing together a combination of the new stretcher fiber and at least one other fiber selected such that the stretcher module has a desired overall dispersion and overall RDS.

Following a discussion of the issues raised in the design of a stretcher module, there is provided a detailed description of the new stretcher fiber and exemplary combinations of the fiber with other fibers to construct a stretcher module it is noted that the described systems and techniques may be used to construct an all-fiber stretcher module having an RDS that is sufficiently high to be used in conjunction with currently used grating compressors.

Short pulse fiber lasers with high pulse energies are desirable for many applications, such as micromachining, and the like. Chirped pulse amplification has been shown to be a durable scheme for producing short pulses, i.e., with a duration of less than 1 picosecond, and pulse energies on the microjoule level, or even the millijoule level.

Figure 1:
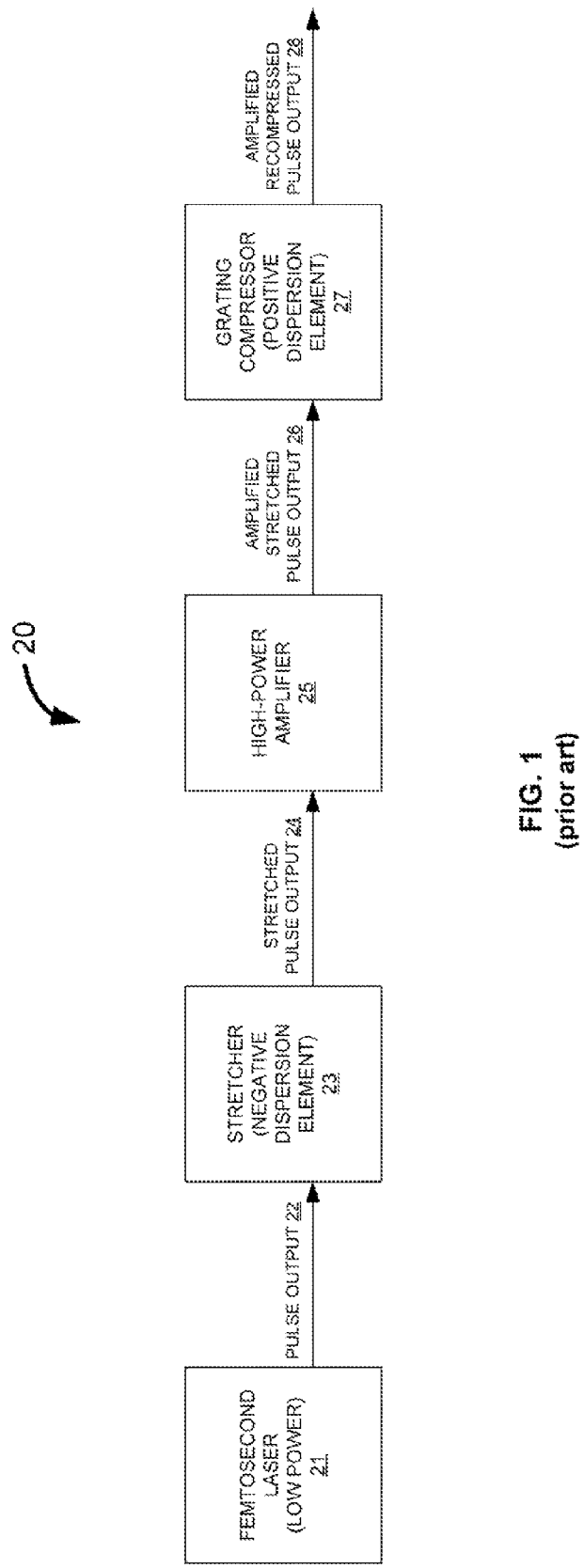
FIG. 1 is a diagram of a chirped pulse amplification system.

FIG. 1 shows a diagram of a typical chirped pulse amplification system 20. A low-power femtosecond oscillator 21 provides a pulse output 22 that is fed into stretcher module 23, which stretches the pulse output, typically by a factor of more than $10^3$. The stretcher module 23 is highly dispersive, in order to reduce the peak power of the pulses. The stretched pulse output 24 can then be linearly amplified in a high-power amplifier 25. The amplified, stretched pulse output 26 is then recompressed by a compressor unit 27, which is a dispersive element having a dispersion opposite to that of the stretcher unit, resulting in an amplified, recompressed pulse output 28.

To characterize the group velocity dispersion, different parameters and their derivatives are used. Within the field of optical fibers, the D-parameter is commonly used. The D-parameter is defined as:

$$D = \frac{dT_g}{d\lambda},$$

where $T_g$, is the group delay and λ is the wavelength. Within the field of lasers, it is more common to use $\beta_2$, the second derivative of the propagation constant (β):

$$\beta_2 = \frac{d^2\beta}{d\omega^2},$$

where ω is the angular frequency. These two parameters are uniquely related as follows:

$$D = -\frac{2\pi c}{\lambda^2}\beta_2,$$

where c is the speed of light in vacuum. In the remainder of the present description, the D-parameter will be used.

In current chirped pulse amplification systems, the stretcher unit and compressor unit are fabricated using free space diffraction grating pairs. However, generally speaking, a fiber-based approach is preferable to an approach using free space optics for a number of reasons. A fiber-based component typically has a smaller size, better stability, longer life, and lower cost, compared with a corresponding free space component.

It is currently not feasible for a compressor unit to be fabricated using an all-fiber approach. For pulse energies above a few nanojoules, the high peak intensities after compression typically lead to significant pulse distortion due to nonlinearities in the compressor fiber. However, these high peak intensities are not an issue with respect to a stretcher unit because of the relatively low power of the laser output prior to amplification and compression. Thus, if a stretcher unit could be constructed using an all-fiber solution, then the entire laser amplification system, up until the compressor unit, could be fabricated from fiber, without any free-space optics.

Figure 2:
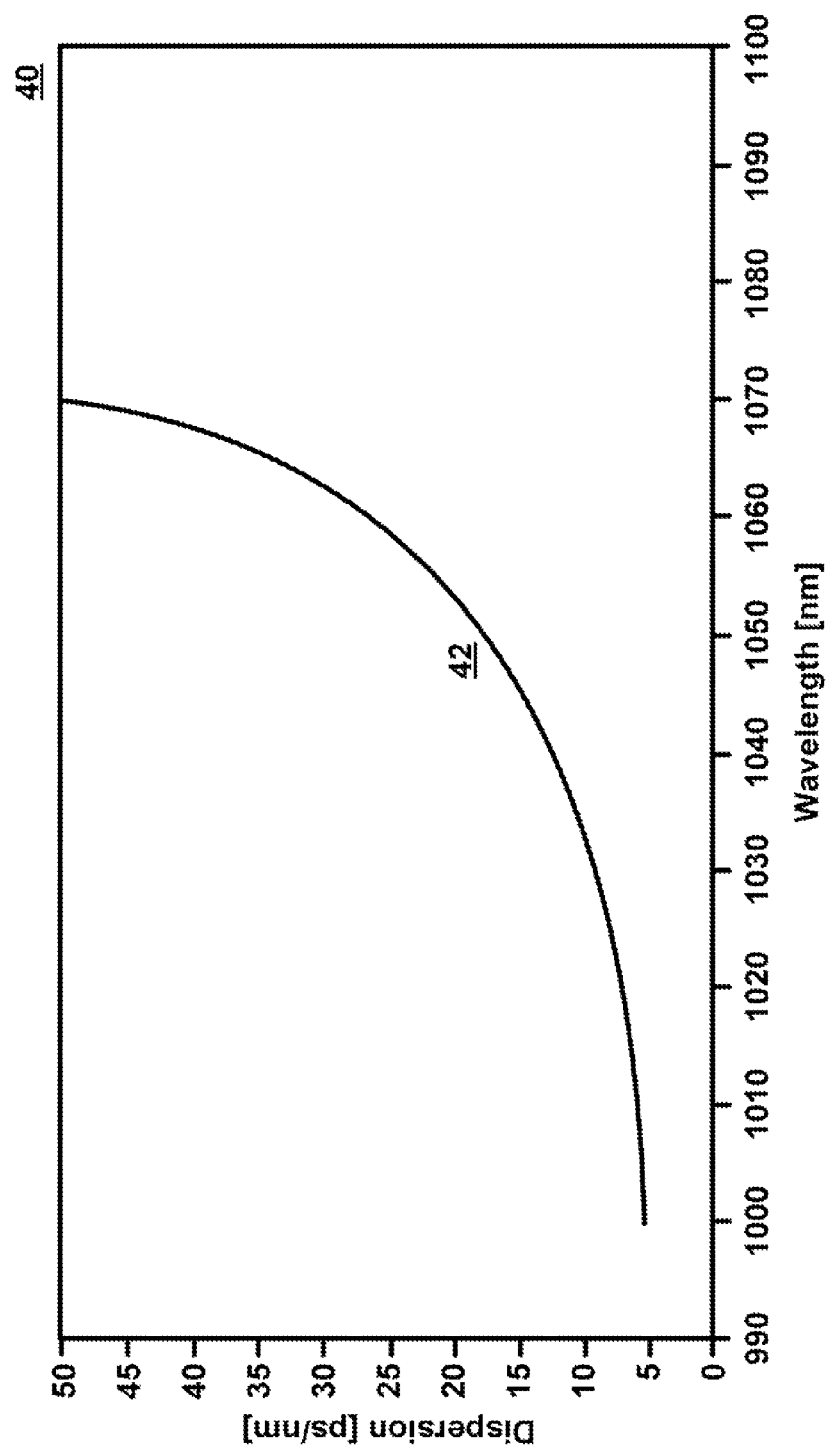
FIG. 2 is a graph in which dispersion is plotted against wavelength for a 1200 lines/mm grating compressor with a grating separation of 0.1 meters at an incidence angle of 18°.
Figure 3:
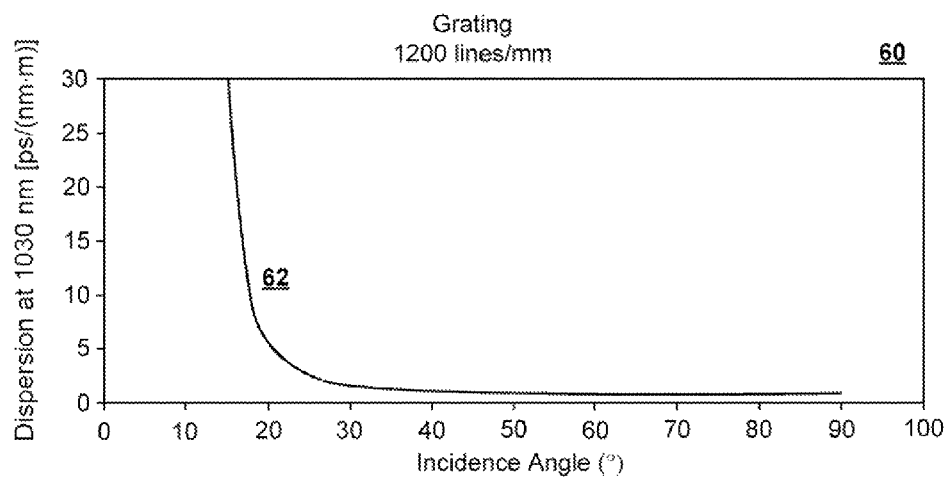
FIGS. 3 and 4 are graphs showing calculated dispersion and RDS at 1030 nm as a function of incidence angle for a 1200 lines/mm grating with a grating separation of 0.1 meters.
Figure 4:
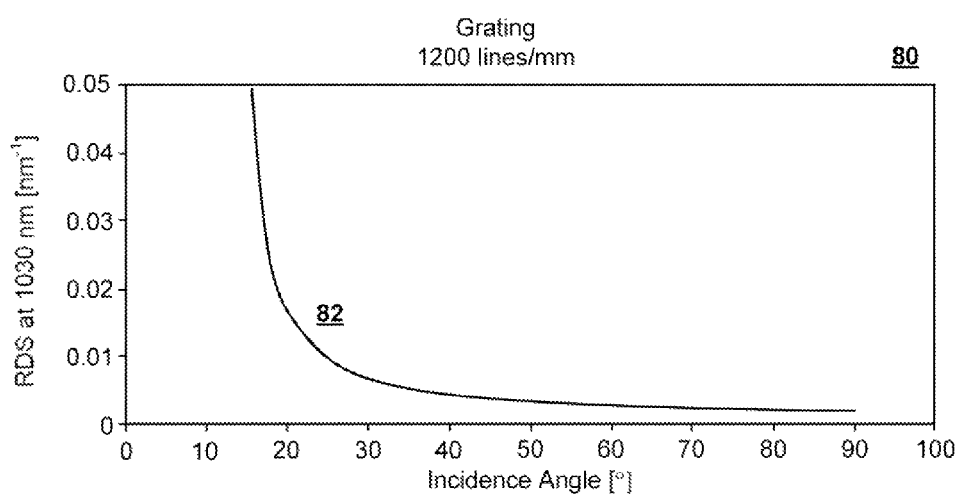

However, there are a number of problems in designing a fiber for use as a stretcher. One problem is that a stretcher ideally should match the dispersion of compressor grating, not only at a single wavelength, but also in the whole spectral range of the pulses, typically 5-20 nm depending on the pulse duration. FIG. 2 shows a graph 40, in which the dispersion (D-parameter) 42 for a 1200 lines/mm grating compressor has been plotted as a function of wavelength, at an incidence angle of 18°, and a grating distance of 0.1 meters. As illustrated in FIG. 2, a grating compressor typically has a relatively large dispersion slope.

When designing fibers for both dispersion and dispersion slope compensation, a useful figure is the relative dispersion slope (RDS), which is defined as:

$$RDS = \frac{S}{D}, \text{ where } S = \frac{dD}{d\lambda}$$

When a fiber should compensate both dispersion and dispersion slope of a dispersion element, the fiber should have same RDS as the dispersion element. The RDS is related to the ratio of the third and second derivatives of the propagation constant through:

$$RDS = -\frac{2\pi c}{\lambda^2} \frac{\beta_3}{\beta_2} - \frac{2}{\lambda}, \text{ where } \beta_3 = \frac{d^3 \beta}{d\omega^3}$$

A general problem in the design of a stretcher fiber is to obtain a sufficiently high RDS. This is clue to a general property of the compressor gratings. To obtain a sufficient stretch ratio, typically a dispersion D ranging from 5 ps/nm to several 100 ps/nm is required. To obtain such dispersion coefficients without too long distances between the gratings, it is necessary to operate the gratings at relatively low incidence angles. This however leads to relatively high RDS values. An example illustrating this is given in FIGS. 3 and 4, which are graphs 60 and 80 of calculated dispersion 62 and RDS 82 at 1030 nm as a function of incidence angle for a 1200 lines/min grating with a grating separation of 0.1 meters.

An aspect of the invention provides a new stretcher fiber design that addresses these and other issues. The presently described example of the fiber has a negative dispersion D, and RDS>0.005 nm$^{-1}$. The fiber has been designed for use in a stretcher module in a chirped pulse amplification system for a short-pulse laser operating in a fiber laser, e.g., in the Yb-fiber gain band (amplification window), i.e., between 1000 nm and 1100 nm. However, it will be appreciated that the described fiber design maybe modified for use in chirped pulse amplification systems for short-pulse lasers operating at other wavelengths, such as, for example, in the 1550 nm band commonly used in existing dispersion compensating fiber technology, as well as in the 800 nm band typically used by Ti-sapphire lasers.

The new fiber is fabricated out of a suitable material that has been doped to create a plurality of regions, each having a respective refractive index. These regions include a central core region extending down the length of the fiber, and a series of concentric regions arranged in successive layers surrounding the core region. The fiber may be manufactured using techniques known in the art, such as, for example, a modified chemical vapor deposition (MCVD) technique, or the like.

Figure 5:
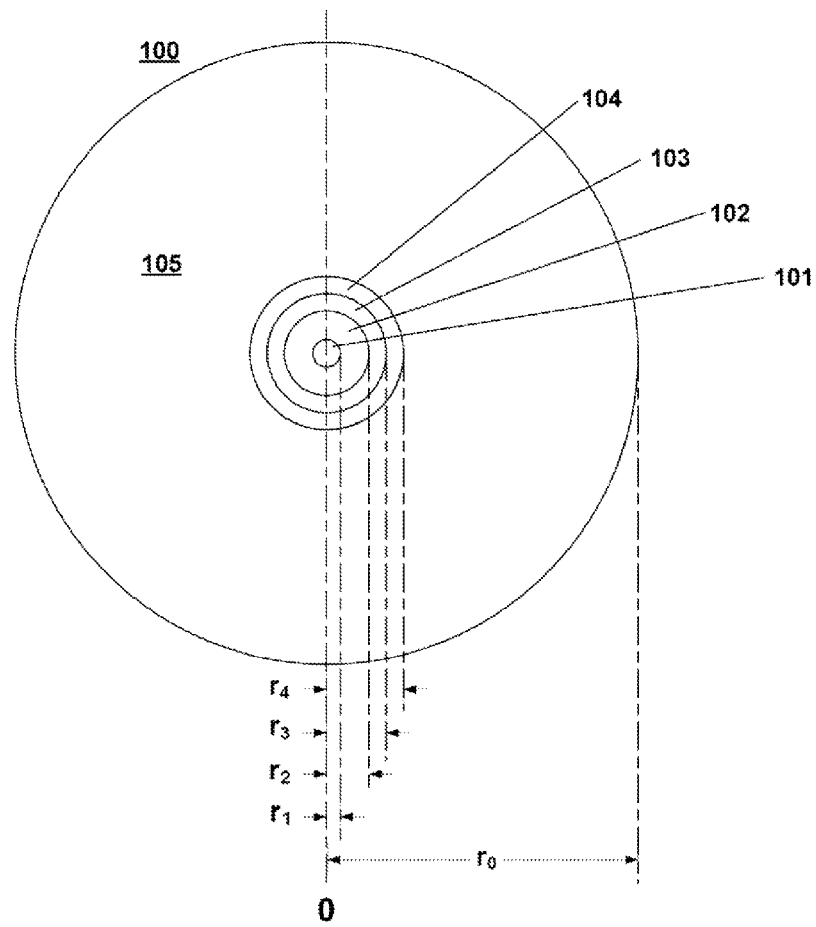
FIG. 5 shows a cross section of a stretcher fiber according to an aspect of the invention.

FIG. 5 shows a diagram of a cross section, not drawn to scale, of the new stretcher fiber 100. As shown in FIG. 5, the fiber includes the following regions: a core 101 having radius $r_1$, an inner trench 102 having outer radius $r_2$, a ring 103 having outer radius $r_3$, an outer trench 104 having outer radius $r_4$, and an outer cladding 105 having outer radius $r_0$. In addition, the fiber may be provided with one or more protective outer layers (not shown).

Figure 6:
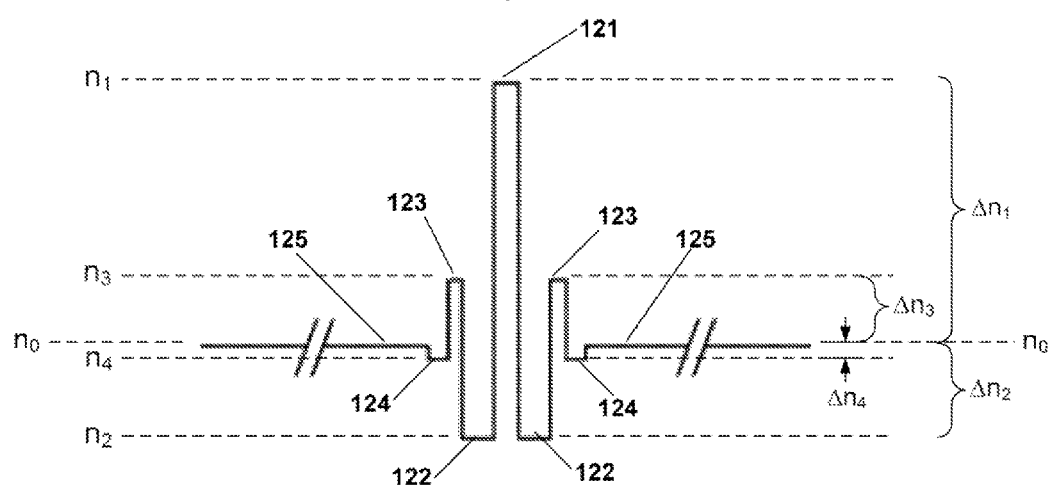
FIG. 6 shows a designed refractive index profile for the fiber shown in FIG. 5.
Figure 7:
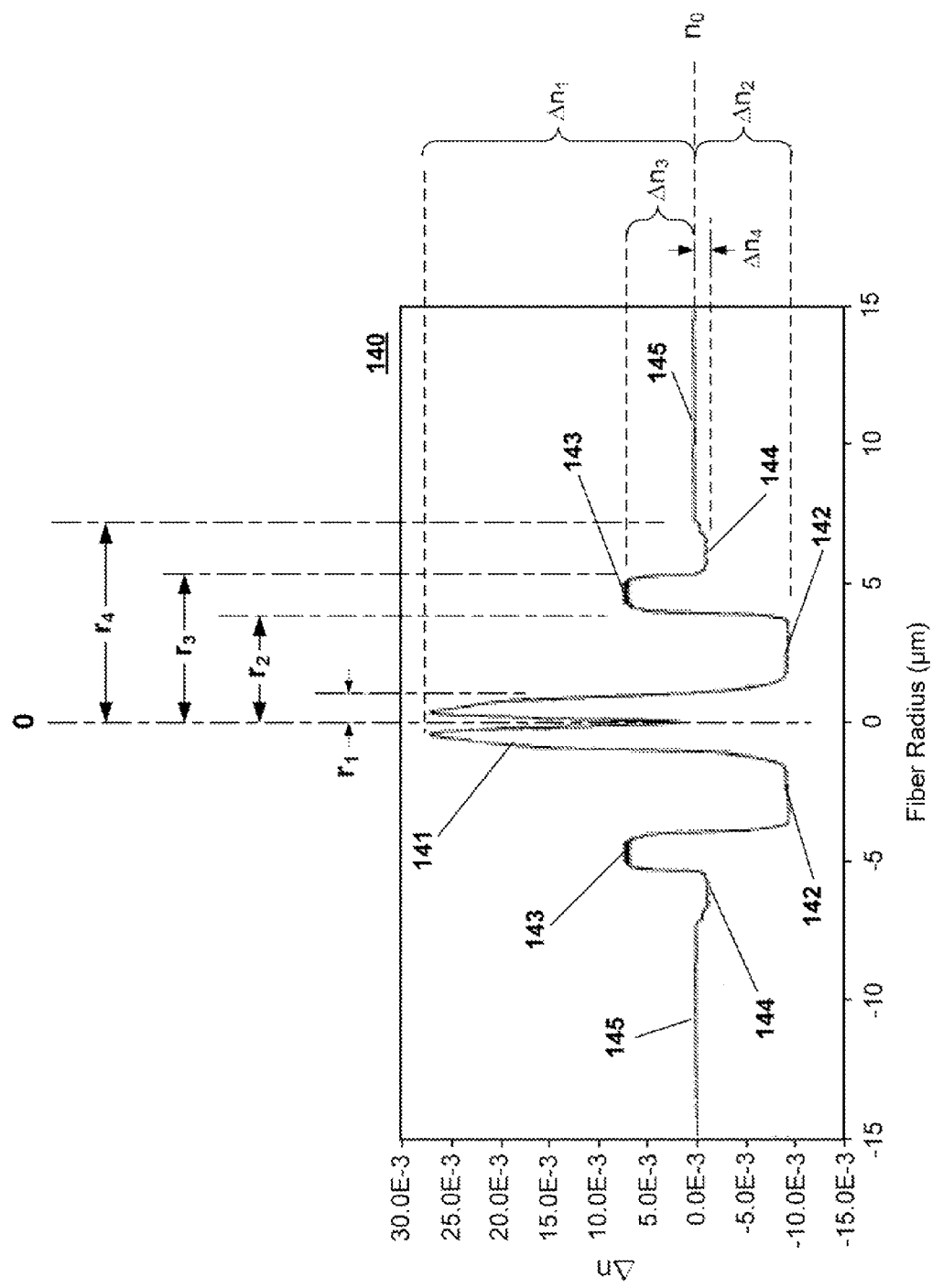
FIG. 7 shows a measured refractive index profile for a fiber manufactured in accordance with the refractive index profile shown in FIG. 6.

FIG. 6 shows a diagram of the desired refractive index profile 120 for the fiber, and FIG. 7 shows the measured refractive index profile 140 obtained from a fiber manufactured according to the desired refractive index profile. For the purpose of the present description, the refractive index of the outer cladding is expressed as no, and the refractive indices of the core, inner trench, ring, and outer trench are respectively expressed as $n_1$–$n_4$. Further, the refractive index of the outer cladding $n_0$ is used to determine the effective refractive index $\Delta n$ for each of the fiber regions. Thus, $\Delta n_1 = n_1 - n_0$;
$\Delta n_2 = n_2 - n_0$;
$\Delta n_3 = n_3 - n_0$; and
$\Delta n_4 = n_4 - n_0$.

As shown in FIGS. 6 and 7, the refractive index profiles 120, 140 include a central spike 121, 141 corresponding to the core region 101, trenches 122, 142 corresponding to the inner trench 102, shoulders 123, 143 corresponding to the ring region 103, and smaller trenches 124, 144 corresponding to the outer trench 104.

FIG. 8 shows a table 200 setting forth the following details for each of the fiber regions: material, dopant, effective refractive index, width, and outer radius.

The material for all five fiber regions is $SiO_2$. Each individual region is created by adding a suitable amount of dopant. The outer cladding 105 is not doped, and has a refractive index $n_0$. The outer radius of the outer cladding is 62.5 micrometers. Thus, the diameter of the stretcher fiber is 125 micrometers.

The core 101 is doped with an index-raising dopant $GeO_2$ and has an effective refractive index $\Delta n_1 = n_1 - n_0 = 21.9 \times 10^{-3}$ and a radius of 0.98 micrometers.

The inner trench 102 is doped with an index-lowering mixture of &pants $GeO_2$ and F and has an effective refractive index $\Delta n_2 = n_2 - n_0 = -8.9 \times 10^{-3}$, a width of 2.96 micrometers, and an outer radius of 3.94 micrometers. In another practice of the invention, the trench is doped with F only.

The ring 103 is doped with an index-raising mixture of dopants $GeO_2$ and has an effective refractive index $\Delta n_3 = n_3 - n_0 = 6.8 \times 10^{-3}$, a width of 1.38 micrometers, and an outer radius of 5.32 micrometers. In another practice of the invention, the ring is doped with $GeO_2$ only.

The outer trench 104 is doped with an index-raising mixture of dopants $P_2O_5$ and F and has an effective refractive index $\Delta n_4 = n_4 - = 6.8 \times 10^{-3}$, a width of 1.76 micrometers, and an outer radius of 7.08 micrometers. Optionally, the mixture of dopants may also include $GeO_2$. In another practice of the invention, the outer trench is doped with F only.

FIG. 9 is a table 210 setting forth various characteristics of a fiber manufactured in accordance with the table 200 set forth in FIG. 8. These characteristics include: relative dispersion slope; dispersion; attenuation; and modefield diameter at 1030 nm and at 1060 nm. The table further sets forth the wavelength resulting in 0.5 dB loss for one turn around a mandrel with a diameter of 30 mm, and the fiber's cutoff wavelength.

As shown in the table 210, at 1030 nm, the fiber has a relative dispersion slope of 0.0094 nm$^{-1}$, a dispersion of −164 ps/(nm-km), an attenuation of 2.9 dB/km and a modefield diameter of 2.9 micrometers. At 1060 nm, the fiber has a relative dispersion slope of 0.130 nm$^{-1}$, a dispersion of −236 ps/(nm-km), an attenuation of 2.6 dB/km, and a modefield diameter of 3.0 micrometers.

Figure 10:
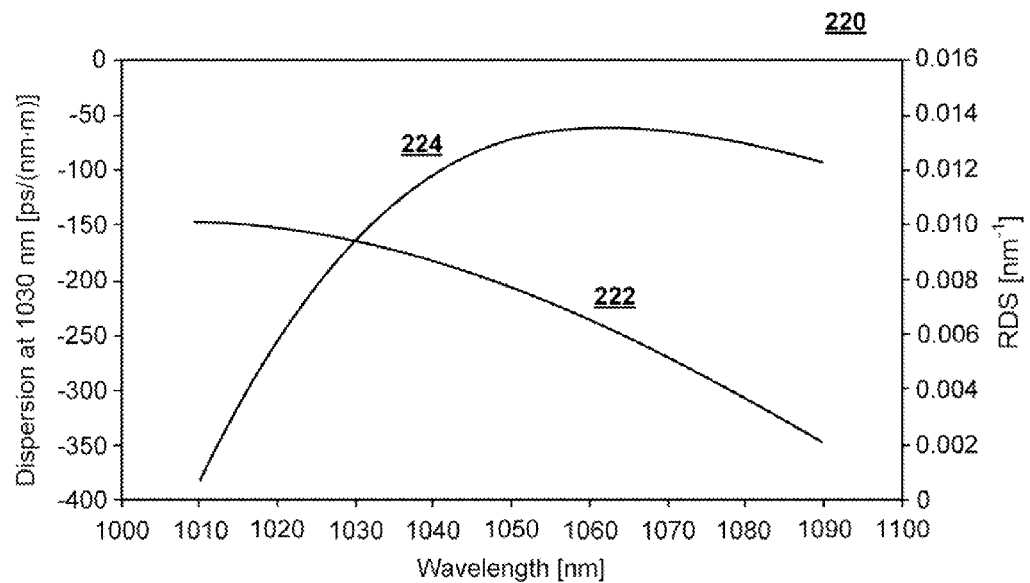
FIGS. 10 and 11 show graphs illustrating dispersion, RDS, and attenuation for the fiber shown in FIGS. 5-7.
Figure 11:
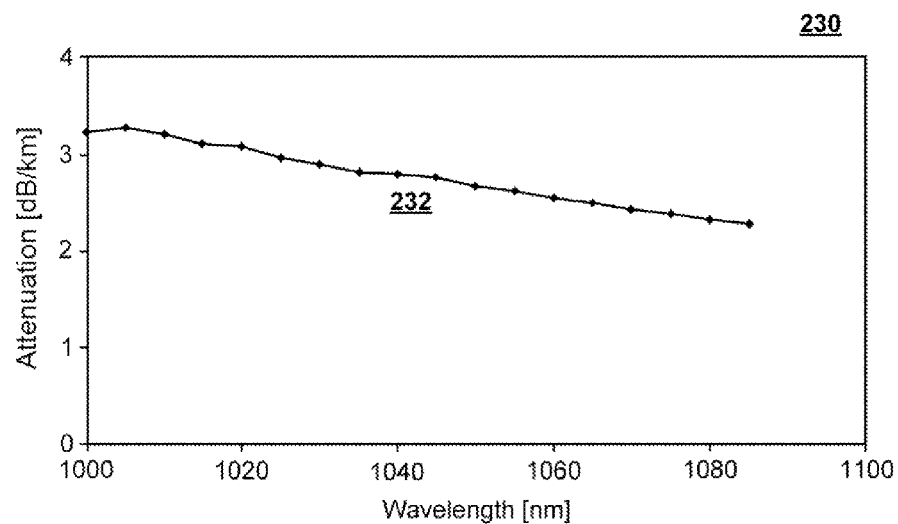

As further shown in table 210, the wavelength resulting in a 0.5 dB loss for one turn around a mandrel with a diameter of 30 mm is 1072 nm. The fiber's cutoff wavelength is 970 nm. It should be noted that the fiber has been designed to have a cutoff wavelength below the selected operating wavelength range. FIG. 10 shows a graph 220 in which dispersion 222 and RDS 224 are plotted as a function of wavelength. FIG. 11 shows a graph 230 in which attenuation 232 is plotted as a function of wavelength.

Figure 13:
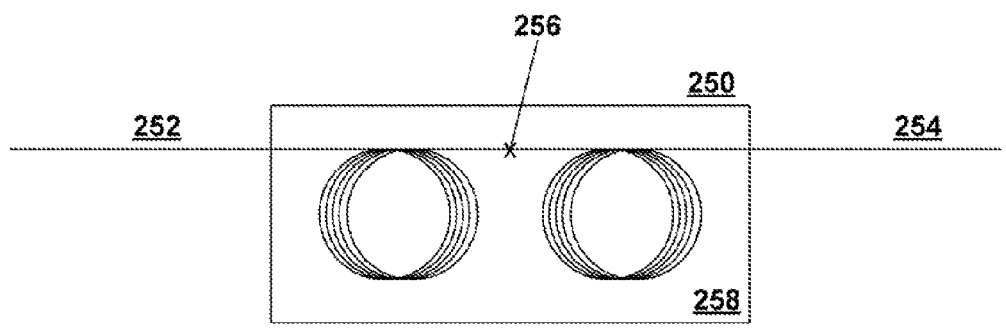
Figure 14:
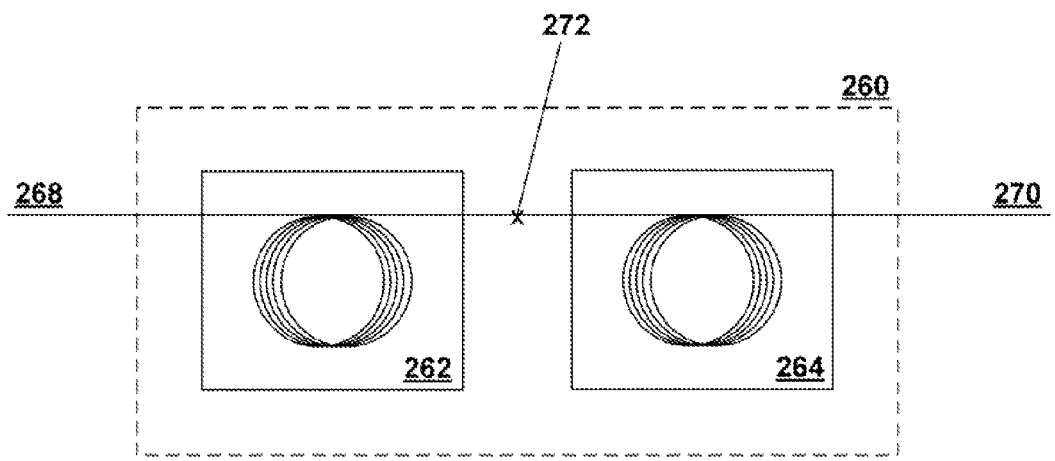

The described fiber may be used in a variety of configurations to form an all-fiber stretcher unit. Some of these configurations are schematically represented in FIGS. 12-14.

Figure 12:
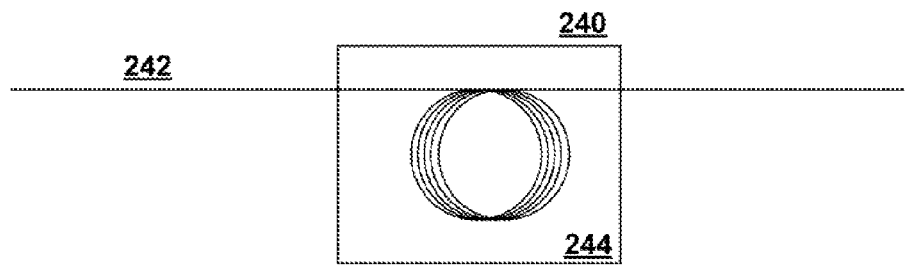
FIGS. 12-14 are diagrams of alternative configurations of a stretcher unit employing the stretcher fiber shown in FIGS. 5-7.

FIG. 12 shows a diagram of a stretcher module 240, in which a length of the new stretcher fiber 242 is loaded into a suitable package 244 and is used by itself to provide the above-described pulse stretching function. This approach would be used where the dispersion and RDS of the length of stretcher fiber 242 matches that of a given compressor unit, without the need for adjustment. If the required length of stretcher fiber 242 is sufficiently short, the fiber may be loaded into the package 244 in the form of a loosely wound coil. A greater length of fiber 242 may be loaded into the package 244 using a spool or other suitable structure.

According to a further aspect of the invention, the dispersion and RDS of a stretcher unit based on the new stretcher fiber may be precisely controlled by combining the stretcher fiber with a second fiber or fiber device having a selected dispersion and RDS. As used hereinafter, the term "fiber" is used to generally refer to a fiber, fiber device, fiber-based structure, or combinations thereof.

By selecting a suitable second fiber for use in combination with the new stretcher fiber, it is possible to precisely control both the overall dispersion and the overall relative dispersion slope of the stretcher module by trimming the lengths of one or both of the stretcher fiber and the second fiber. It should be noted that it would be possible, in principle, to extrapolate the present discussion to apply to a stretcher module in which the new stretcher fiber is combined with more than one other fiber to achieve the desired result, i.e., matching of the stretcher module to a particular compressor module.

The second fiber may be combined with the new stretcher fiber in various physical configurations. For example, as illustrated in FIG. 13, the stretcher fiber 252 and second fiber 254 are joined to each other at splice point 256 and housed together in a single package 258 for installation into a CPA system. Alternatively, as illustrated in FIG. 14, the stretcher module 260 may comprise a plurality of packaging units 262 and 264 housing respective lengths of stretcher fiber 268 and the second fiber 270, which are joined together at splice point 272. Stretcher modules based on a combination of the new stretcher fiber and a second fiber not only provide flexibility in controlling the amount of RDS that can be obtained, but also provide very precise control of both dispersion and RDS, as these can be controlled individually by adjusting the respective lengths of the two fibers.

Figure 15:
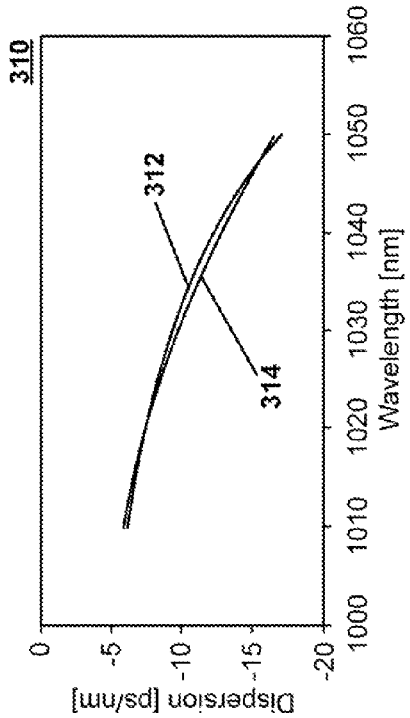
FIGS. 15-18 are graphs illustrating the use of the stretcher fiber shown in FIGS. 5-7 in combination with a second fiber to match the dispersion and RDS of a grating compressor unit.
Figure 16:
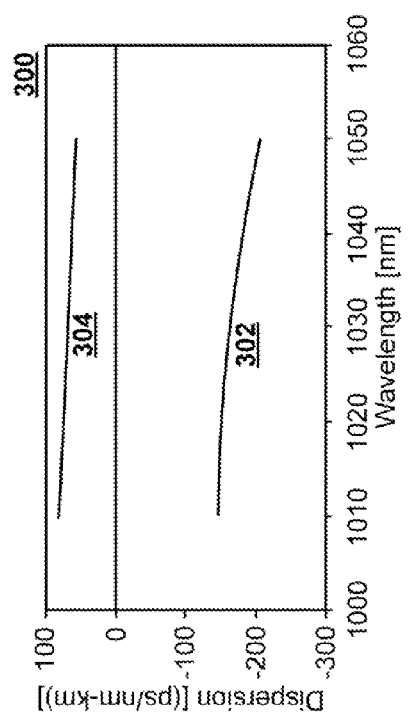

For example, it is possible to construct a stretcher unit with an RDS that is higher than that of the stretcher fiber alone by combining the stretcher fiber with a second fiber having a positive dispersion D and negative RDS. In one exemplary implementation, the stretcher fiber was combined with a fiber device with positive I) and negative RDS operating in a higher order mode (HOM), e.g., the $LP_{02}$ mode. The fiber device used in the implementation is commercially available from OFS under the trade name FemtoComp™. FIGS. 15 and 16 show how by combining the new fiber (D=−164 ps/(nm-km) and RDS=0.0094 nm$^{-1}$ at 1030 nm) with FemtoComp™ (D=69 ps/(nm-km) and RDS=−0.0093 nm$^{-1}$ at 1030 nm), a grating compressor with an RDS of 0.0025 nm$^{-1}$ at 1030 nm can be matched.

FIG. 15 shows a graph 300 in which dispersion is plotted as a function of wavelength for the new fiber (lower plot 302) and for a FemtoComp™ fiber device (upper plot 304). FIG. 16 shows a graph 310 including a plot 312 of the target dispersion, −D of a 1200 lines/mm compressor grating, operating at an incidence angle of 18° and a grating separation of 0.1 m. The FIG. 16 graph further illustrates the dispersion plot 314 obtained by combining 119 meters of the new fiber followed by 142 meters of FemtoComp™ HOM fiber.

Figure 17:
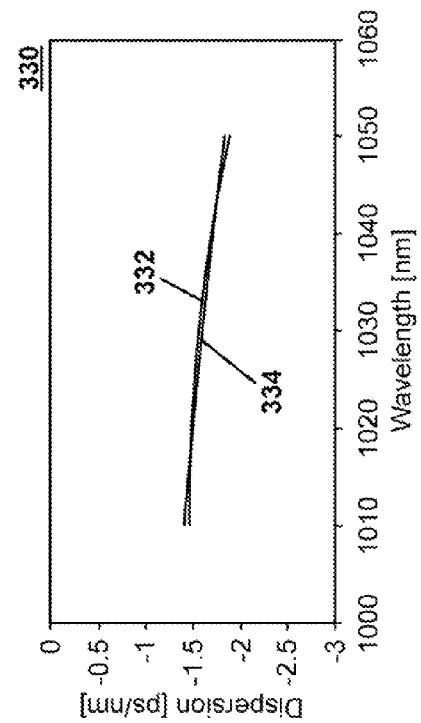
Figure 18:
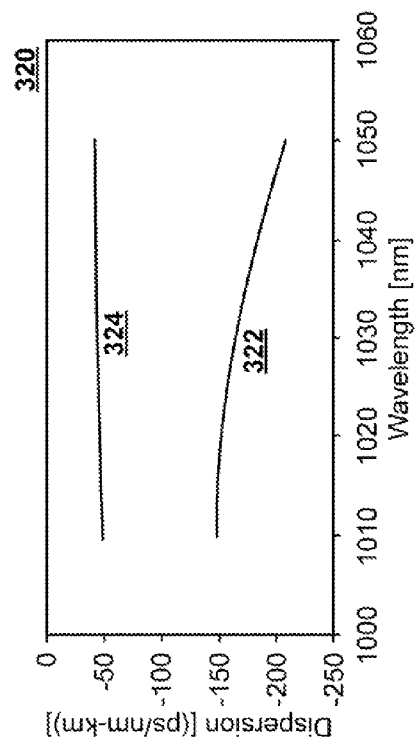

Alternatively, it is possible to construct a stretcher unit with an RDS that is lower than that of the stretcher fiber alone by combining the stretcher fiber with a second fiber or fiber device having a negative dispersion D and negative RDS. One such fiber, for example, is a standard low-cutoff single mode fiber, such as ClearLite™ 980-14 from OFS or HI-1060 from Corning. FIGS. 17 and 18 show how by combining the new fiber (D=−164 ps/(nm-kin) and RDS=0.0094 nm at 1030 nm) with ClearLite™ 980-14 (D=−44 ps/(nm-km) and RDS=−0.0041 nm$^{-1}$ at 1030 nm) a grating compressor with an RDS of 0.0068 nm-km at 1030 nm can be matched.

FIG. 17 shows a graph 320 in which dispersion is plotted as a function of wavelength for the new fiber (lower plot 322) and for a ClearLite™ CL980-14 single mode fiber (upper plot 324). FIG. 18 shows a graph 330 setting forth a plot 332 of the target dispersion, −D of a 1200 lines/mm compressor grating working at an incidence angle of 30° and a grating separation of 0.1 m. The FIG. 16 graph further illustrates the dispersion plot 334 obtained by combining 7.8 meters of the new fiber followed by 6.5 meters of ClearLite™ CL980-14 fiber.

The splice loss resulting from splicing a length of the stretcher fiber to a length of standard low-cutoff fiber, such as ClearLite™ 980-14 from OFS or HI-1060 from Corning, has been tested. These fibers are routinely used in fiber lasers working in the band 1000 nm to 1100 nm. A splice loss of 0.17 dB to ClearLite™ 980-14 has been demonstrated, using the thermally expanded modefield technique described in U.S. Pat. No. 6,565,269, commonly owned with the present application, the disclosure and drawings of which are incorporated herein by reference in their entirety.

Figure 19:
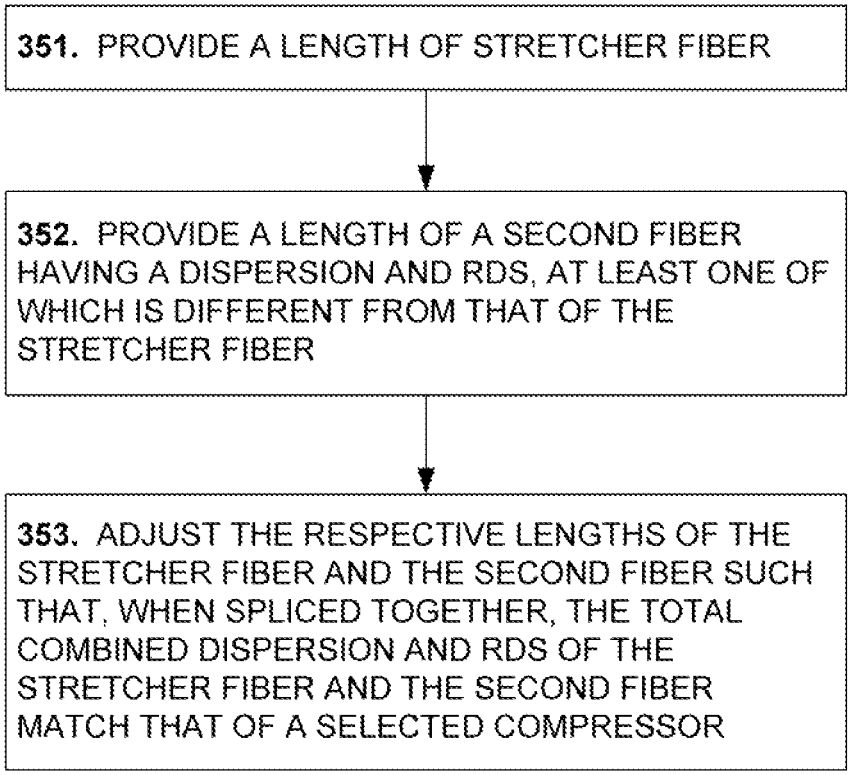
FIG. 19 is a flowchart of a method for constructing a stretcher module according to a further aspect of the invention.

FIG. 19 shows a flowchart of a general method 350 according to a further aspect of the invention. In step 351, a length of the new stretcher fiber is provided. In step 352, a length of a second fiber is provided having a dispersion and RDS, at least one of which is different from that of the stretcher fiber. In step 353, the respective lengths of the stretcher fiber and the second fiber are adjusted such that, when spliced together, the total combined dispersion and RDS of the stretcher fiber and the second fiber match that of a selected compressor.

It will be appreciated that the systems and techniques described above provide a number of advantages over the prior art. Compared to a grating-based stretcher, a system according to the present invention provides more precise control of both RDS and dispersion. In addition, the presently described system provides the advantages of smaller size, better stability, longer lifetime, and lower cost.

II. Additional Details with Respect to the Design and Manufacture of the Stretcher Fibers Described in Section I There are now provided additional details with respect to the design and manufacture of the stretcher fibers described in Section I. In addition, a number of further features and aspects of the invention are described. These include, for example, the relatively low polarization mode dispersion of fibers designed and manufactured according to the described techniques. Also discussed below are data obtained from testing samples of the described fibers. These data provide, among other things, empirical confirmation of a stretcher module comprising a unitary length of stretcher fiber.

The presently described techniques have been used to design and manufacture a stretcher fiber with normal dispersion and a β3/β2 ratio of −7.7 femtoseconds at 1030 nm. It is believed that this is the highest numerical value reported so far for a β3/β2 ratio at this wavelength. The fiber shows good dispersion matching to a compressor grating for second-order, third-order, and even fourth-order dispersion. The fiber has low propagation loss, as well as low splice loss to standard single-mode fiber. It also exhibits low polarization mode dispersion (PMD). As used herein, the term "low-PMD" refers to a fiber exhibiting a PMD coefficient of less than 0.2 ps/km$^{-1/2}$.

By combining this fiber with a higher-order mode (HOM) fiber with anomalous dispersion and positive β3/β2 ratio, it is possible to obtain even higher β3/β2 ratios. A very good match of second-order, third-order, and fourth-order dispersion of a grating compressor with a β3/β2 ratio of −15 fs has been demonstrated. The HOM fiber has low propagation loss and low PMD, and further has a low insertion loss per mode converter of 0.5 dB, including splices.

The described fiber can be used to reduce the number of couplings between free-space optics and fibers in ultrafast fiber lasers using chirped pulse amplification. This reduces internal loss in the lasers, improves stability, and can reduce the size of the lasers.

As set forth in further detail below, the described fiber has a quadruple-cladding index profile. Quadruple-cladding index profiles have been used in dispersion compensating fiber (DCF) designs, which typically operate in the vicinity of 1550 nm. An examination of the relationship between dispersion and wavelength for such fibers indicates that a quadruple-cladding DCF design can be advantageously used in the design of a stretcher fiber.

According to an aspect of the presently described technique, a quadruple-cladding fiber design is selected. The dispersion properties of the selected fiber are measured and graphed. The dispersion graphs are examined, and a wavelength region of interest is identified. The quadruple-cladding fiber design is then scaled, in order to move the region of interest to a selected wavelength range.

As discussed below, the scaling of the quadruple-cladding DCF fiber design for operation at a lower wavelength, e.g., 1000 nm, is not a straightforward task and must take into account a number of considerations, including, for example: material dispersion, macrobend and microbend loss, and cutoff wavelength.

The present discussion makes reference to the refractive index profile 120 shown in FIG. 6. As discussed above, the refractive index profile comprises a core central spike 121 having a radius $r_1$, and having a refractive index difference $\Delta n_1 = n_1 - n_0$, where $n_1$ is the refractive index of the central spike 121 and $n_0$ is the refractive index of outer cladding 125.

The core 121 is surrounded by four concentric cladding regions:

an inner trench 122 having an outer radius $r_2$, and having a refractive index difference $\Delta n_2 = n_2 - n_0$, where $n_2$ is the refractive index of the inner trench 122;

a shoulder 123 having an outer radius $r_3$, and having a refractive index difference $\Delta n_3 = n_3 - n_0$, where $n_3$ is the refractive index of shoulder 123;

an outer trench 124 having an outer radius $r_3$, and having a refractive index difference $\Delta n_4 = n_4 - n_0$, where $n_4$ is the refractive index of outer trench 124; and an outer cladding 125 having an outer radius $r_0$, and having a refractive index difference $\Delta n_0 = n_0 - n_0 = 0.0$.

Figure 20:
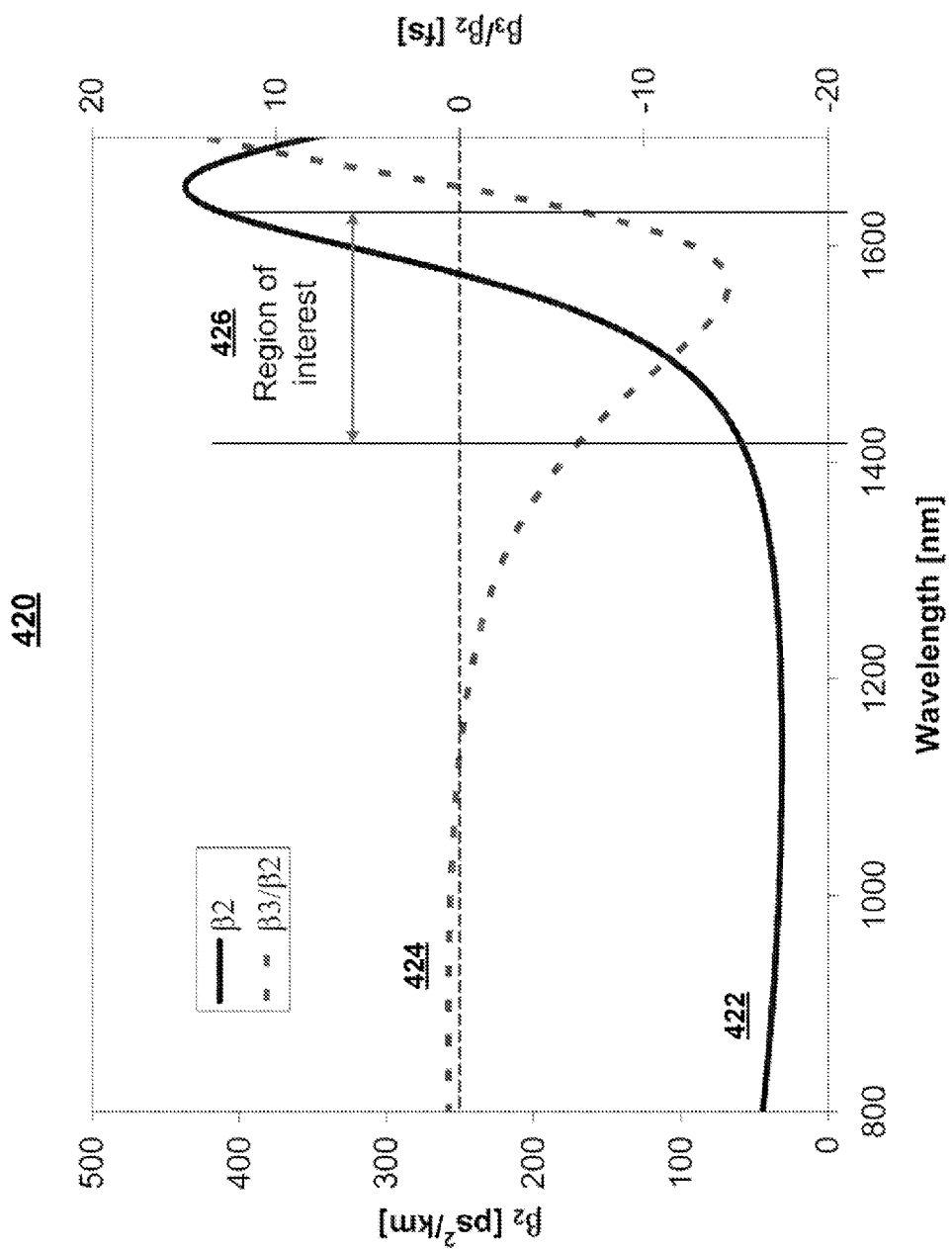
FIG. 20 is a graph showing the relationship between dispersion and wavelength for the exemplary fiber design shown in FIG. 6.

FIG. 20 is a graph 420 showing the relationship between dispersion and wavelength for the exemplary fiber design shown in FIG. 6. Graph 420 includes the fiber's β2 curve 422 and β3/β2 curve 424. As discussed above, $\beta_2$ is the second derivative of the propagation constant β:

$$\beta_2 = \frac{d^2\beta}{d\omega^2}$$

and $\beta_3$ is the third derivative of the propagation constant β:

$$\beta_3 = \frac{d^3\beta}{d\omega^3}$$

where ω is the angular frequency.

As shown in FIG. 20, the values for β2 range from less than 100 ps²/km to greater than 400 ps²/km. The values for β3/β2 range from less than −10 fs to greater than 10 fs. It will also be generally appreciated from a visual inspection of curves 422 and 424 that the fiber dispersion displays a significant fourth derivative β4.

According to a practice of the described technique, a "region of interest" 426 is identified in graph 420, in which the exemplary fiber displays high values for β2, while at the same time displaying high absolute values for β3/β2. Within the identified region of interest 426, the β2 and β3/β2 curves 422 and 424 generally fit the shape of a dispersion-versus-wavelength curve of a grating compressor.

A DCF typically has an operating wavelength range in the vicinity of 1550 nm. A stretcher fiber, on the other hand, typically operates in the 1000 nm wavelength range. By scaling the index profile, the dispersion curves shown in FIG. 20 can be moved along the wavelength axis. Thus, according to a practice of the described technique, the radial dimensions illustrated in FIG. 6 reflect a downscaling to obtain the required dispersion properties and single-mode operation in a wavelength range in the vicinity of 1000 nm. A scaling technique is described, for example, in P. Kristensen. "Design of dispersion compensating fiber," in Proceedings of ECOC'2004, Paper We.3.3.1 (2004) ("Kristensen 2004"), and Lars Grüner-Nielsen et al., "Dispersion-Compensating, Fibers," Journal of Lightwave Technology, Vol. 23, Issue 11, pp. 3566-3579 (2005) ("Grüner-Nielsen 2005"), both of which are incorporated herein by reference in its entirety.

Kristensen 2004 discloses techniques for analyzing the propagation characteristics of a quadruple-clad DCF design, including dispersion and bend loss. A scaling of the index was found to provide a family of DCF with similar dispersion characteristics, but different bend loss characteristics. Once a design with desired dispersion characteristics has been found, the described techniques allow for a separate optimizing of the other propagation parameters of the fiber.

As described in greater detail in Kristensen 2004, an understanding of the propagation properties of a quadruple-clad DCF refractive index profile can be gained by considering the two guiding regions, the core and the cladding, separately. The propagation characteristics of the combined system can then be obtained by the use of coupled-mode theory.

In a described technique, the index profile for the DCF core is obtained by removing the ring from the DCF index profile. The index profile for the DCF ring is obtained by removing the core form the DCF index profile. It is then possible to calculate, for each of the two index profiles, the relationship between refractive index difference Δn and wavelength. In Kristensen 2004, the calculations were based on solving the scalar wave equation using a finite element formulation.

Calculations indicate that at low wavelengths, the index difference of the $LP_{01}$ mode of the combined system approaches the index difference of the core mode. At high wavelengths, the index difference of the LP01 mode approaches the index difference of the ring mode. These results indicate that the $LP_{01}$ mode is confined to the core at low wavelengths whereas at high wavelengths it becomes confined in the ring. The $LP_{02}$ mode behaves in an opposite manner, making a transition from being confined in the ring at low wavelengths to having greater with the core as the wavelength increases.

Considering the two guiding regions separately is useful when inspecting how the scalar wave equation changes, as the index and radius of the index profile are changed. In particular, the described techniques provide a way to analyze how changes in the refractive index of a quadruple-clad DCF design affect the fiber's general chromatic dispersion curve, usable bandwidth versus relative dispersion slope, and bend loss versus cutoff. Thus, the described techniques provide a fiber designer with the ability, when scaling a DCF design, to use numerical methods to analyze and optimize performance aspects of DCF designs during the scaling process.

In particular, as described in greater detail in Grüner-Nielsen 2005, numerical methods can be used to analyze the obtainable properties and design tradeoffs in a quadruple-clad design.

The fiber mode field expands with wavelength, with a resulting change in the dispersion curve. A DCF relies on large waveguide dispersion from the expanding mode field. Thus, when designing a DCF, or scaling an existing design, it is important to take microbend and macrobend loss into consideration.

Generally, it is important to keep the effective index of the mode from becoming too low. One way to Maintain a sufficiently high effective index is to increase the index of the core or the ring. However, increasing the index can only be done to a certain extent before the fiber will start to support higher-order modes (HOMs). Guidance of HOMs should be avoided because the HOMs can interfere with the fundamental mode, leading to modal noise from multipath interference (MPI). Another drawback of increasing the core index is increased loss due to higher $GeO_2$ doping and anomalous loss. Designing a DCF, or scaling an existing design, therefore requires a balance between the wanted dispersion properties, macrobend loss, microbend loss, and HOM cutoff wavelength.

Applying the above-described techniques to the fibers described herein, it will be seen that the scaling of a quadruple-cladding DCF design for use at a lower operating wavelength, e.g. 1000 nm, is not a straightforward task, and a number of considerations must be taken into account.

First of all, the total dispersion of an optical fiber is a combination of waveguide dispersion and material dispersion. Material dispersion is wavelength dependent. In a typical fiber, the amount of normal dispersion increases as wavelength decreases. Thus, a scaling of the quadruple-cladding DCF refractive index profile for operation at a lower wavelength must take this increased dispersion into account.

Further, a quadruple-cladding DCF design relies on the fact that the modefield diameter (MFD) expands with wavelength, which leads to large waveguide dispersion. It is therefore important to take microbend and macrobend loss into consideration. Microbend and macrobend bend loss become an issue when the effective refractive index of the mode becomes too low. The effective index can be increased by increasing the refractive index of the core 121 and/or the ring 123. This approach can, however, only be used to a certain extent, as it will also increase the higher-order mode cutoff wavelength, which should be lower than the operating wavelength range to ensure single-mode operation. All of these considerations must be taken into account when scaling a quadruple-cladding DCF design for operation at a lower wavelength.

Another consideration to be taken into account is the implementation of a fiber design. For example, the above-described scaling technique may result in a refractive index profile calling for a trench region having a depth that is difficult to achieve with commonly used dopants. In an exemplary stretcher Tiber designed and fabricated according to a practice of the described techniques, such a trench was implemented using silicon tetrafluoride ($SiF_4$) as a dopant. Another approach to creating such a trench region is through the use of a microstructured photonic band-gap fiber.

Figure 22:
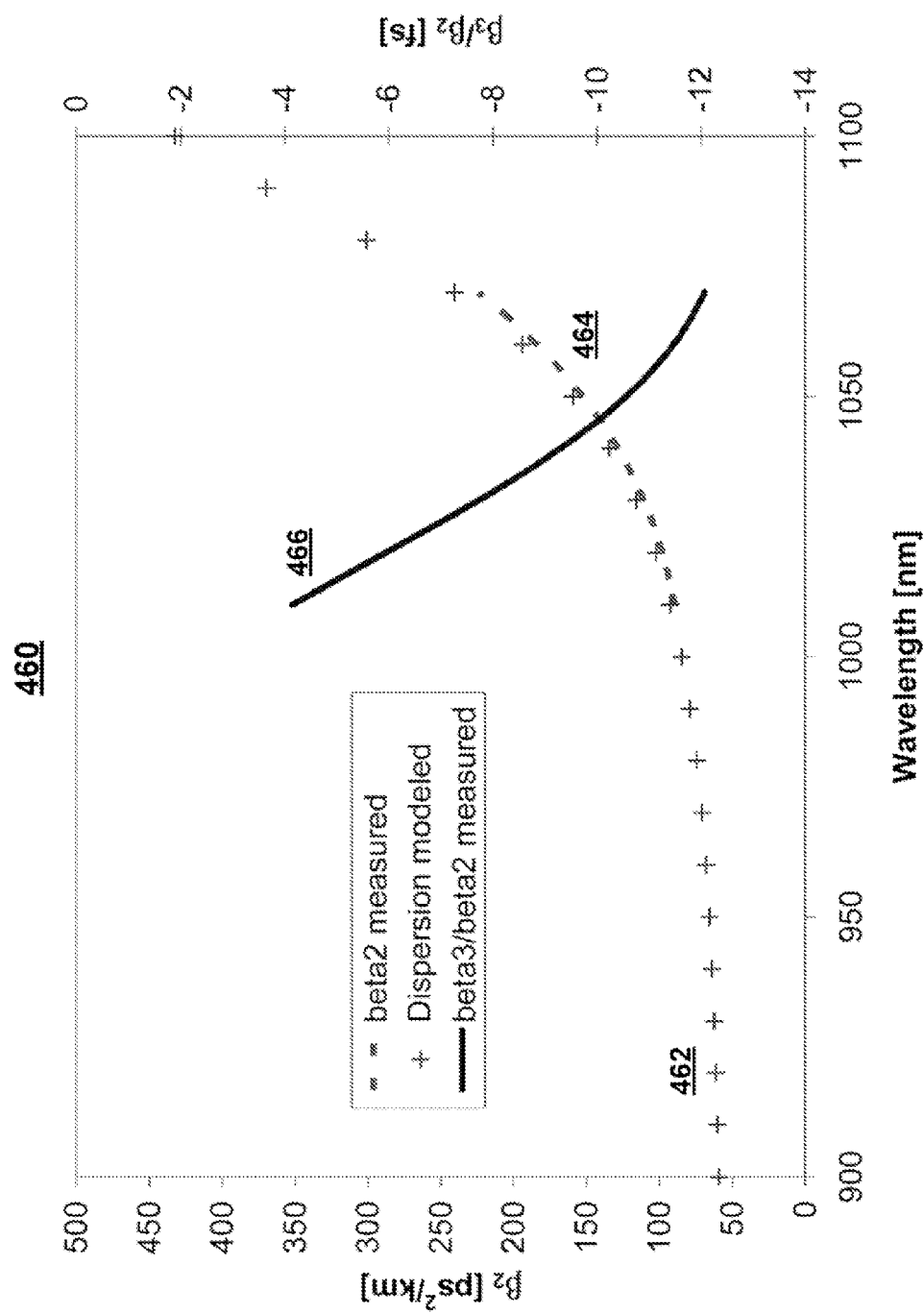
FIG. 22 is a dispersion graph for a 7 km spool of an exemplary stretcher fiber.

An exemplary stretcher fiber satisfying the above criteria was drawn from a preform manufactured using the modified chemical vapor deposition (MCVD) technique. FIG. 22 shows a table 440 setting forth the properties of the exemplary stretcher fiber at 1030 nm.

The dispersion properties of the fiber was measured on a Photon Kinetics PK 2800 Dispersion Measurement System, which uses a modulation phase shift technique to measure change in group delay as a function of wavelength. A fourth-order polynomial was fitted to the measured group delay and differentiated to obtain the dispersion and higher-order dispersion. Attenuation, effective area, and cutoff wavelength were measured on a Photon Kinetics PK 2210 Optical Fiber Analysis System. Polarization mode dispersion (PMD) was measured using a fixed analyzer system with a broad-band light source and a spectrum analyzer with polarizers connected to the fiber input and output.

FIG. 22 is a dispersion graph 460 for a 7 km spool of the exemplary stretcher fiber. Curve 462, comprising a series of cross marks, shows the modeled dispersion, which was calculated from the measured preform refractive index profile by using a finite element mode solver to solve the scalar wave equation. Curve 464, comprising a series of dashes, shows the measured 132. Curve 466 shows the measured β3/β2.

A β3/β2 ratio having a high absolute value of −7.7 femtoseconds was observed at 1030 nm. This value is significantly higher than previously reported values. The observed PMD was also very low. A low splice loss of 0.2 dB was obtained when splicing the fiber to standard low-cutoff fiber, such as ClearLite™ 980-14, for 1000 nm wavelength range operation. FIG. 22 shows a high degree of agreement between measured dispersion (curve 464) and dispersion modeled from the index profile (curve 462).

Figure 23:
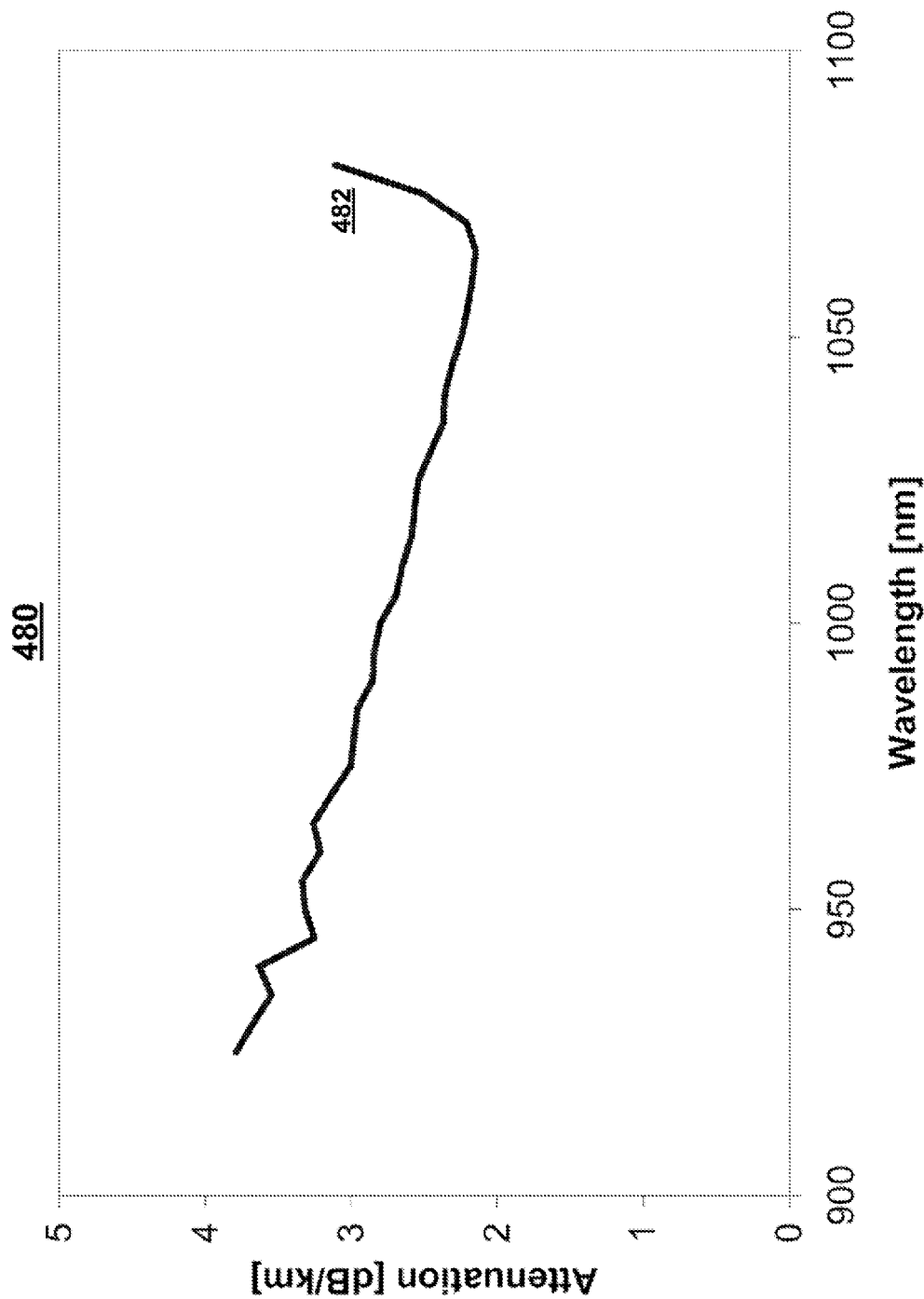
FIG. 23 is a graph showing measured attenuation versus wavelength for a 7 km spool of an exemplary stretcher fiber.

FIG. 23 is a graph 480 in which curve 482 shows measured attenuation versus wavelength for the 7 km spool. The operation wavelength band for the fiber is 945 nm to 1070 nm. It is observed that the loss increases steeply for wavelengths greater than 1070 nm, i.e., the upper limit of the wavelength band. The steep increase is loss is attributable to bend loss from the bending of the fiber on the spool, which has a bend radius of 90 mm. The cutoff wavelength, which is measured to 945 nm, gives the lower limit for the operation wavelength band.

Figure 24:
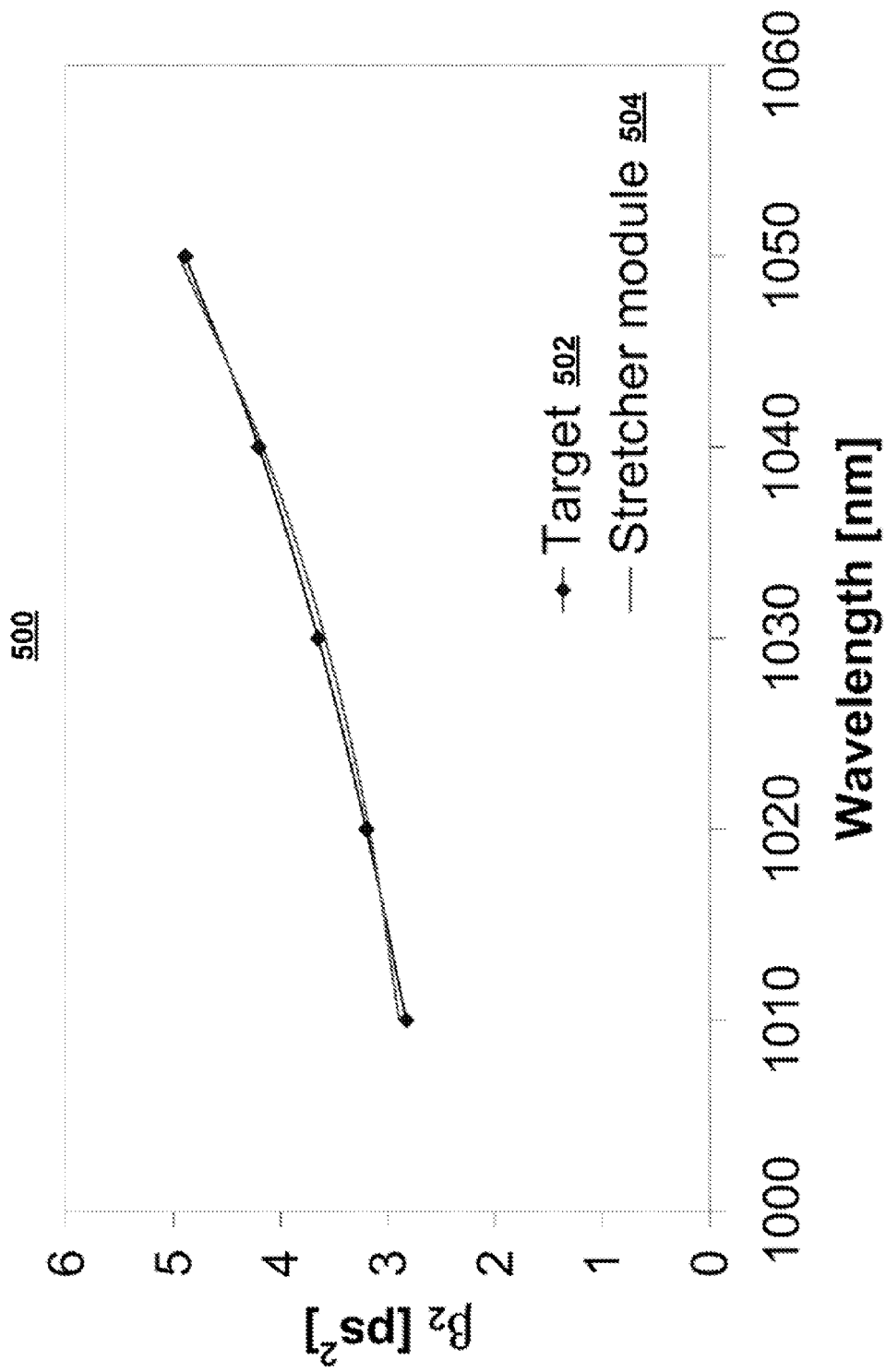
FIG. 24 is a graph illustrating an exemplary stretcher fiber can be used to provide compensation for a grating compressor comprising two 1200-line gratings working with an incident angle of 23° and a grating distance of 0.2 m.

A unitary length of the described stretcher fiber can be packaged by itself to provide a stretcher module. FIG. 24 is a graph 500 that illustrates how the fabricated stretcher fiber can be used to provide compensation for a grating compressor comprising two 1200-line gratings working with an incident angle of 23° and a grating distance of 0.2 m. A good match is observed, not only to the third derivative, slope ($\beta 3$), but also to the fourth derivative, curvature (134).

To further increase the numerical value of the $\beta 3/\beta 2$ ratio, the stretcher fiber can be combined with a fiber with anomalous dispersion, i.e., a fiber with a refractive index that increases with increasing wavelength. Anomalous dispersion in the 1000 nm wavelength range can be obtained using a fiber working in a higher order mode (HOM). Such a fiber is described in S.Ramachandran et al., "Anomalous dispersion in a solid, silica-based fiber," Opt. Lett. 31(17), 2532-2534 (2006), and commonly owned United States Published Patent Application No. 2007/0206910, both of which are incorporated herein by reference in their entirety.

FIG. 25 is a table 520 that shows measured properties for a fabricated HOM fiber working in the $LP_{02}$ mode at 1030 nm.

Figure 26:
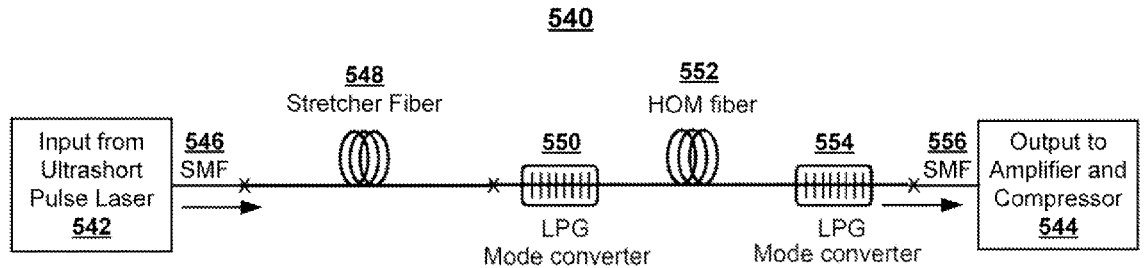
FIG. 26 shows a diagram illustrating a configuration of an exemplary stretcher module.

FIG. 26 shows a diagram illustrating a configuration of a stretcher module 540 according to an aspect of the invention. As described above, the stretcher module receives as an input 542 the output of an ultrashort pulse laser, and provides an output 544 to an amplifier and compressor.

The stretcher module 540 includes the following components connected in series between the stretcher module input 542 and output 544: a first length of a single-mode fiber (SMF) 546, a length of stretcher fiber 548, a first long-period grating (LPG) mode converter 550, a length of the HOM fiber 552, a second LPG mode converter 554, and a second length of SMF 556.

LPG mode converters 550 and 554 are used to convert between the $LP_{01}$ and $LP_{02}$ mode and provide input and output coupling for the HOM fiber 552. The whole module is pigtailed with SMF 556 for 1000 nm wavelength operation.

Figure 27:
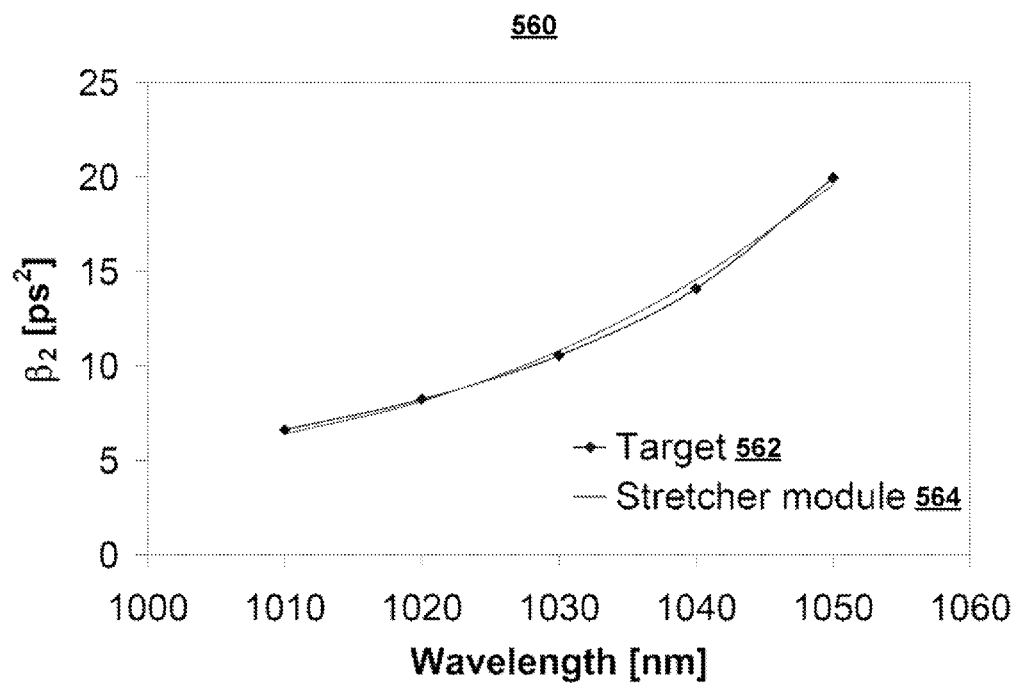
FIG. 27 is a graph showing dispersion for a stretcher module comprising 90 meters of stretcher fiber and 125 meters of HOM fiber.

FIG. 27 is a graph 560, in which curve 562 shows dispersion for a stretcher module comprising 90 meters of stretcher fiber and 125 meters of HOM fiber. FIG. 27 also shows a target dispersion curve 564, which is the dispersion, with inverted sign for a grating compressor composed of two 1200 lines/mm gratings separated by a distance of 0.2 m and operating at an incidence angle of 18°. The $\beta 3/\beta 2$ ratios for the grating compressor and stretcher module are, respectively, −15.0 fs and −16.8 fs.

A further advantage of the stretcher module proposed above made of a combination of two fibers, besides the higher numerical $\beta 3/\beta 2$ ratio, is that variations in the dispersion coefficient from manufacturing variations can be compensated for by trimming the length of the two fibers. Therefore, not only $\beta_2$, but also $\beta_3$ of a given grating can be precisely hit every time in a mass production.

Figure 28:
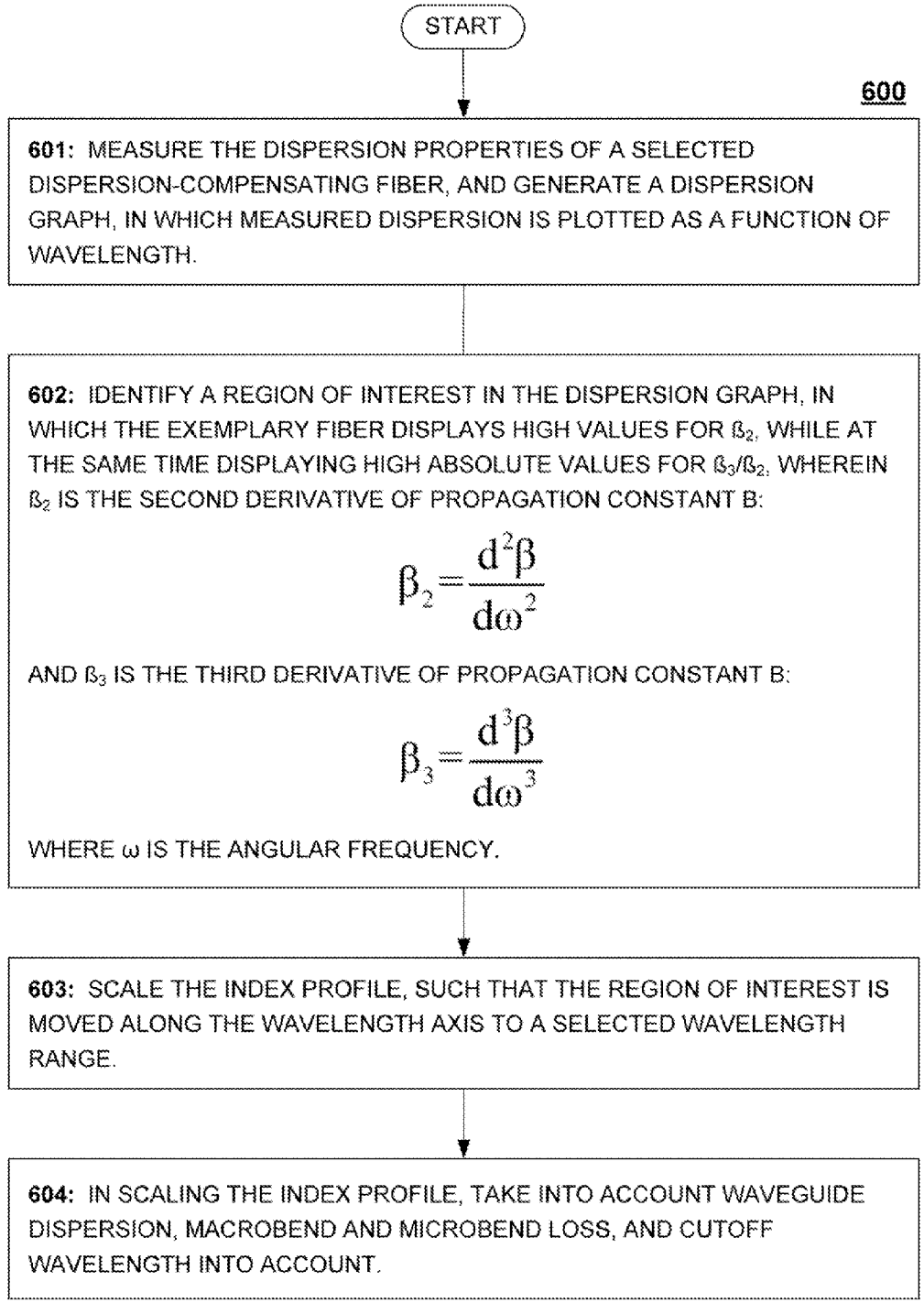
FIG. 28 is a flowchart of an overall technique for designing and manufacturing a stretcher fiber for use in conjunction with a compressor.

FIG. 28 is a flowchart of an overall technique 600, according to the above-described practices, for designing and manufacturing a stretcher fiber for use in conjunction with a compressor.

The overall technique includes the following steps:

601: Measure the dispersion properties of a selected dispersion-compensating fiber, and generate a dispersion graph, in which measured dispersion is plotted as a function of wavelength.

602: Identify a region of interest in the dispersion graph, in which the exemplary fiber displays high values for $\beta_2$, while at the same time displaying high absolute values for $\beta_3/\beta_2$, wherein $\beta_2$ is the second derivative of propagation constant $\beta$:

$$\beta_2 = \frac{d^2\beta}{d\omega^2}$$

and $\beta_3$ is the third derivative of propagation constant $\beta$:

$$\beta_3 = \frac{d^3\beta}{d\omega^3}$$

where $\omega$ is the angular frequency.

603: Scale the index profile, such that the region of interest is moved along the wavelength axis to a selected wavelength range.

604: In scaling the index profile, take into account wavelength dispersion, material dispersion, macrobend and microbend loss, and cutoff wavelength.

While the foregoing description includes details which will enable those skilled in he art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. A stretcher fiber, comprising:
   a core region having a radius $r_1$, a refractive index $n_1$, and a positive refractive index difference $\Delta n_1$ with respect to an outer cladding region having an outer radius $r_0$ and a refractive index $n_0$, where $\Delta n_1$ is equal to $n_1-n_0$,
   an inner trench region surrounding the core region, the trench region having an outer radius $r_2$, a refractive index $n_2$ less than $n_0$, and a negative refractive index difference $\Delta n_2$ equal to $n_2-n_0$,
   a ring region surrounding the trench region, the ring region having an outer radius $r_3$, a refractive index $n_3$ greater than $n_0$, and a positive refractive index difference $\Delta n_3$ equal to $n_3 - n_0$,
   an outer trench region surrounding the ring region, the outer trench region having an outer radius $r_4$, a refractive index $n_4$ less than $n_0$, and a negative refractive index difference $\Delta n_4$ equal to $n_4-n_0$,
   the outer cladding region surrounding the outer trench region,
   wherein the values of $r_0$, $r_1$, $r_2$, $r_3$, $r_4$, $\Delta n_1$, $\Delta n_2$, $\Delta n_3$, and $\Delta n_4$ are structured to provide the stretcher fiber with a relationship between dispersion and wavelength, wherein the stretcher fiber $\beta_2$ and $\beta_3/\beta_2$ curves have a shape and wavelength range matching those of a selected compressor module,
   wherein $\beta_2$ is the second derivative of the stretcher fiber's propagation constant $\beta$ with respect to angular frequency $\omega$:

$$\beta_2 = \frac{d^2\beta}{d\omega^2},$$

and
   wherein $\beta_3$ is the third derivative of the selected fiber's propagation constant $\beta$ with respect to angular frequency $\omega$:

$$\beta_3 = \frac{d^3\beta}{d\omega^3}.$$

2. The stretcher fiber of claim 1, wherein the fiber has a polarization mode dispersion coefficient less than 0.2 ps/km$^{-1/2}$.

3. The stretcher fiber of claim 1, wherein the values of $r_0$, $r_1$, $r_2$, $r_3$, $r_4$, $\Delta n_1$, $\Delta n_2$, $\Delta n_3$, and $\Delta n_4$ are structured to provide the stretcher fiber with a relationship between dispersion and wavelength with a fourth derivative matching that of the selected compressor module.

4. The stretcher fiber of claim 1,
wherein the values of $r_0$, $r_1$, $r_2$, $r_3$, $r_4$, $\Delta n_1$, $\Delta n_2$, $\Delta n_3$, and $\Delta n_4$ are structured to cause the fiber to have a negative dispersion and to have a relative dispersion slope greater than 0.005 $nm^{-1}$ at a specific wavelength within a selected operating wavelength band.

5. The stretcher fiber of claim 1, wherein the selected operating wavelength band is between 1000 and 1100 nm.

6. The stretcher fiber of claim 5, wherein the specific wavelength within the wavelength band is 1030 nm.

7. The stretcher fiber of claim 5, wherein the specific wavelength within the wavelength band is 1060 nm.

8. The stretcher fiber of claim 1, wherein the fiber has a cutoff wavelength below the selected operating wavelength band.

9. The stretcher fiber of claim 8, wherein the selected operating wavelength band is between 1000 and 1100 nm, and wherein the cutoff wavelength is 970 nm.

10. The stretcher fiber of claim 1, wherein the fiber is spliceable with a splice loss of less than 0.5 dB to a single-mode fiber having a cutoff wavelength below the operating wavelength hand.

11. The stretcher fiber of claim 1, wherein:
$r_0$=0.98 μm;
$r_1$=3.94 μm;
$r_2$=5.32 μm;
$r_3$=7.08 μm;
$r_4$=62.50 μm;
$\Delta n_1$=21.9×$10^{-3}$;
$\Delta n_2$=−8.9×$10^{-3}$;
$\Delta n_3$=6.8×$10^{-3}$; and
$\Delta n_4$=−1.0×$10^{-3}$.

12. The stretcher fiber of claim 11, wherein the core, inner trench, ring, outer trench, and outer cladding are fabricated from $SiO_2$, and wherein the core is doped with $GeO_2$.

13. The stretcher fiber of claim 12, wherein the inner trench is doped with a mixture of $GeO_2$ and F.

14. The stretcher fiber of claim 12, wherein the inner trench is doped only with F.

15. The stretcher fiber of claim 12, wherein the ring is dope with a mixture of $GeO_2$ and F.

16. The stretcher fiber of claim 12, wherein the ring is doped only with $GeO_2$.

17. The stretcher fiber of claim 12, wherein the outer trench is doped with a mixture of $P_2O_5$ and F.

18. The stretcher fiber of claim 17, wherein the outer trench is additionally doped with $GeO_2$.

19. The stretcher fiber of claim 12, wherein the outer trench is doped only with F.

20. A stretcher module for use in a pulse amplification system, the stretcher module comprising a unitary length of the stretcher fiber of claim 1.

\* \* \* \* \*